United States Patent [19]

Elimar et al.

[11] Patent Number: 5,914,147
[45] Date of Patent: Jun. 22, 1999

[54] METHOD OF HANDLING MOULDS CONTAINING MEAT PRODUCTS AND PLANT FOR THE EXECUTION OF THE METHOD

[75] Inventors: Kjeld Elimar; Bjarne Nielsen, both of Aalborg, Denmark

[73] Assignee: SKF-Danfotech A/S, Aalborg, Denmark

[21] Appl. No.: 08/809,352

[22] PCT Filed: Sep. 27, 1995

[86] PCT No.: PCT/DK95/00385

§ 371 Date: Jun. 30, 1997

§ 102(e) Date: Jun. 30, 1997

[87] PCT Pub. No.: WO96/10337

PCT Pub. Date: Apr. 11, 1996

[30] Foreign Application Priority Data

Sep. 30, 1994 [DK] Denmark ................................. 1141/94

[51] Int. Cl.⁶ ................................. A22C 7/00; B30B 7/00
[52] U.S. Cl. ........................... 426/513; 99/349; 100/194; 100/910; 425/338; 425/411
[58] Field of Search ................... 426/513, 512; 425/338, 411; 100/194, 910; 99/349, 367, 369

[56] References Cited

U.S. PATENT DOCUMENTS 3,750,563  8/1973  Tonjum ..................................... 99/349
5,381,725  1/1995  Breunig et al. ........................... 99/349

*Primary Examiner*—George Yeung
*Attorney, Agent, or Firm*—Lee, Mann, Smith, McWilliams, Sweeney & Ohlson

[57] ABSTRACT

A pressing column for the pressing, for example, of hams in molds is provided with shelves to support the molds. The shelves are mutually connected by links which allow a certain mutual movement between the shelves in the vertical direction. By raising the upper part in the pressing column, the shelves can be pushed in from the side of the column from a platform which is adjustable in height. Hereafter, the upper part can be lowered and the contents of the molds are pressed in a normal manner with a pressing apparatus. After the pressing and the boiling of the hams, the shelves are again separated and the molds are removed. According to the method and the plant according to the invention, the molds are automatically positioned in relation to the vertical by a separate operation which results principally in an overall positioning of all molds in the column at one time, whereby the pressing can be carried out in a fully-automatic manner with a minimal consumption of time, and with minimal demands on the mechanical arrangements used for the insertion and positioning.

12 Claims, 7 Drawing Sheets

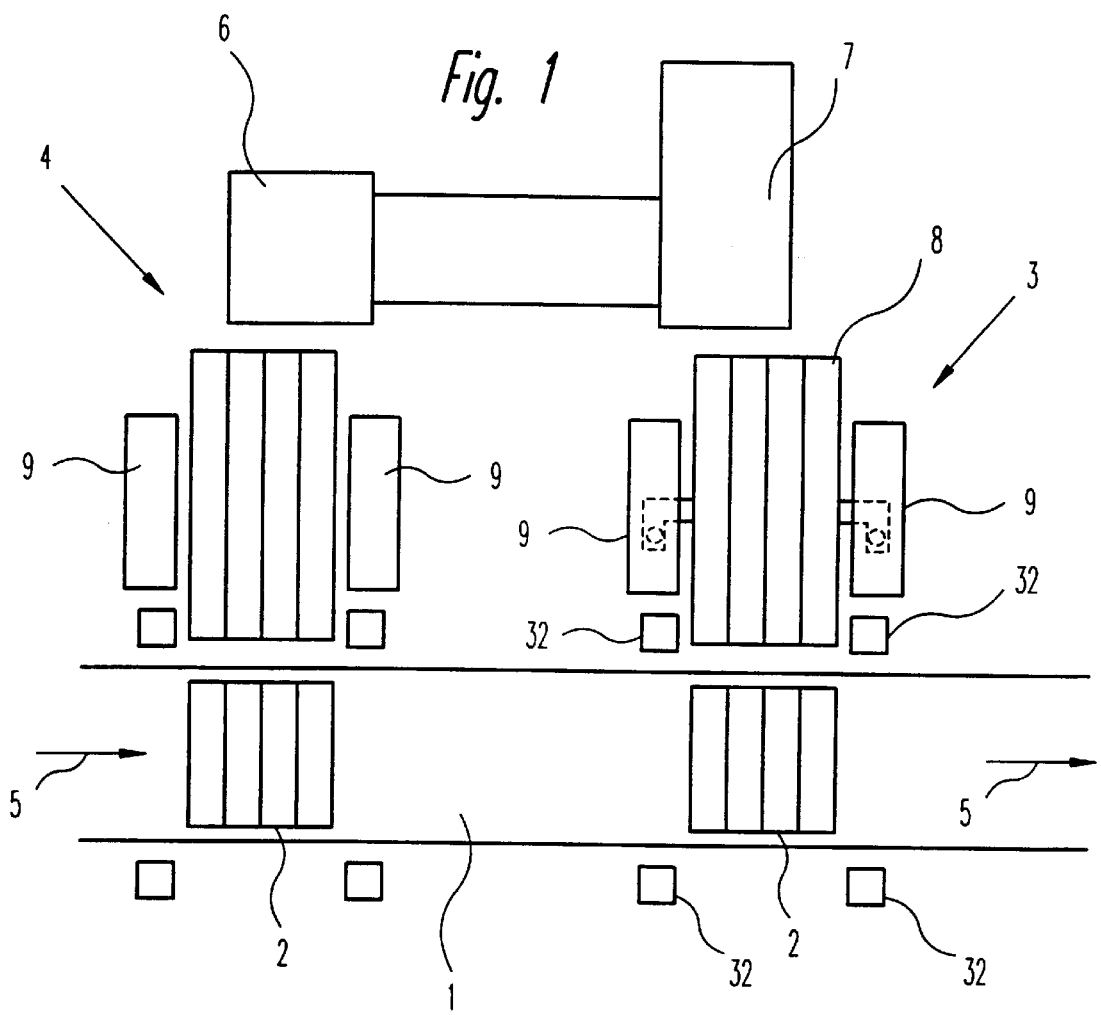
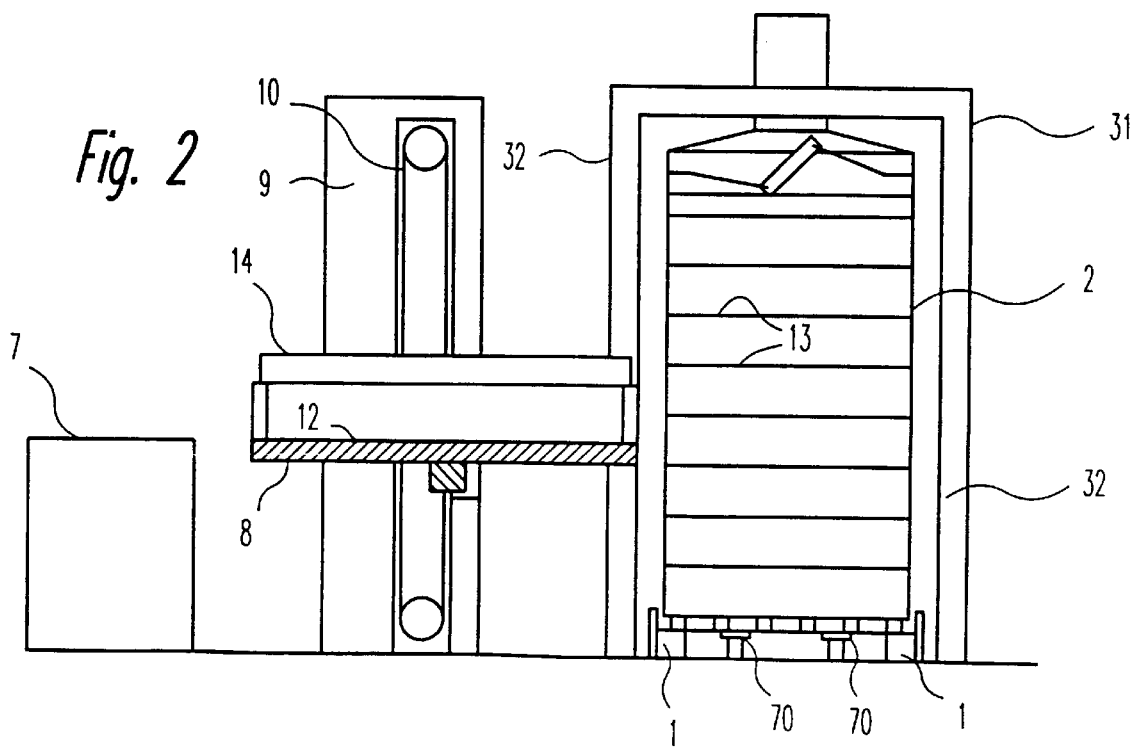

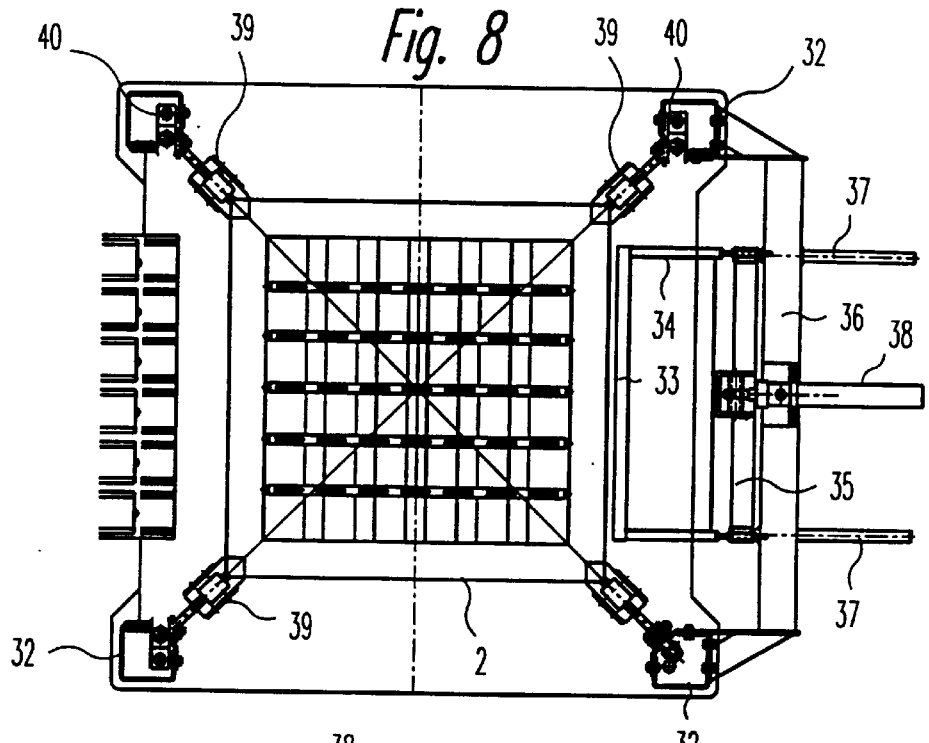
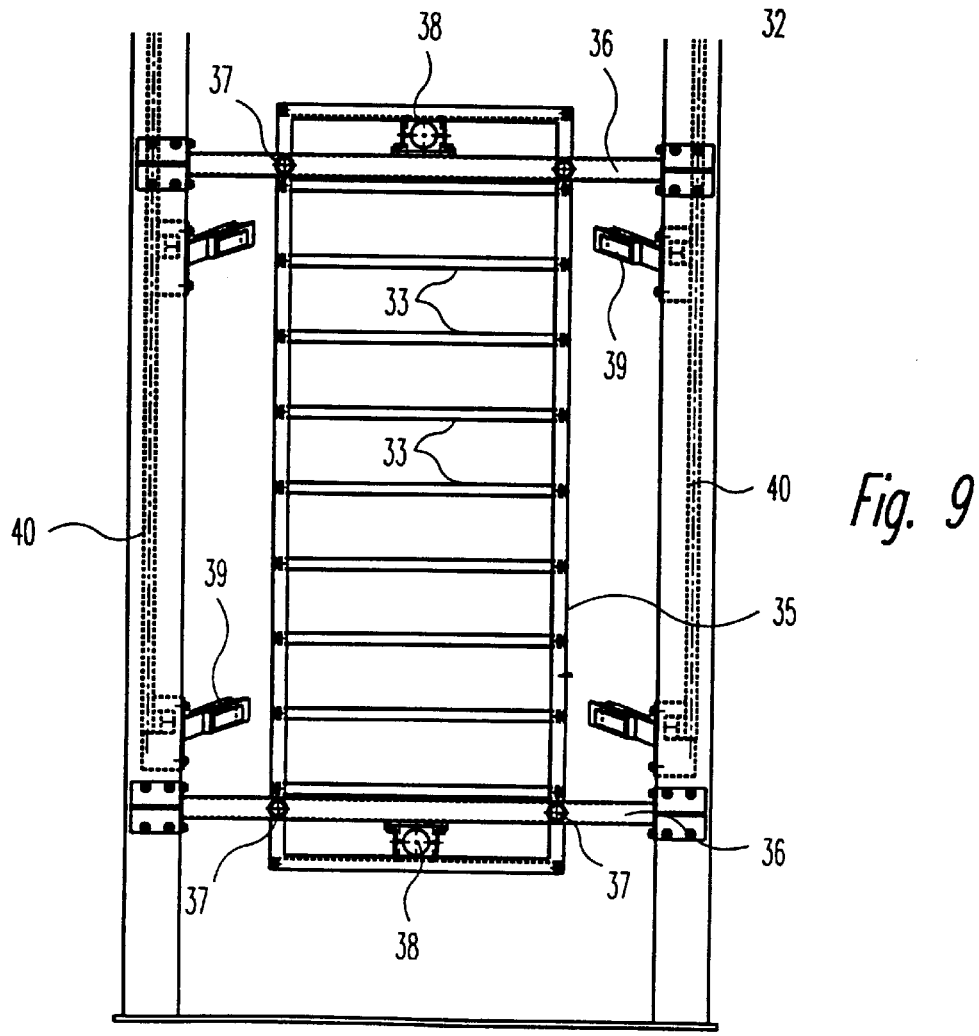

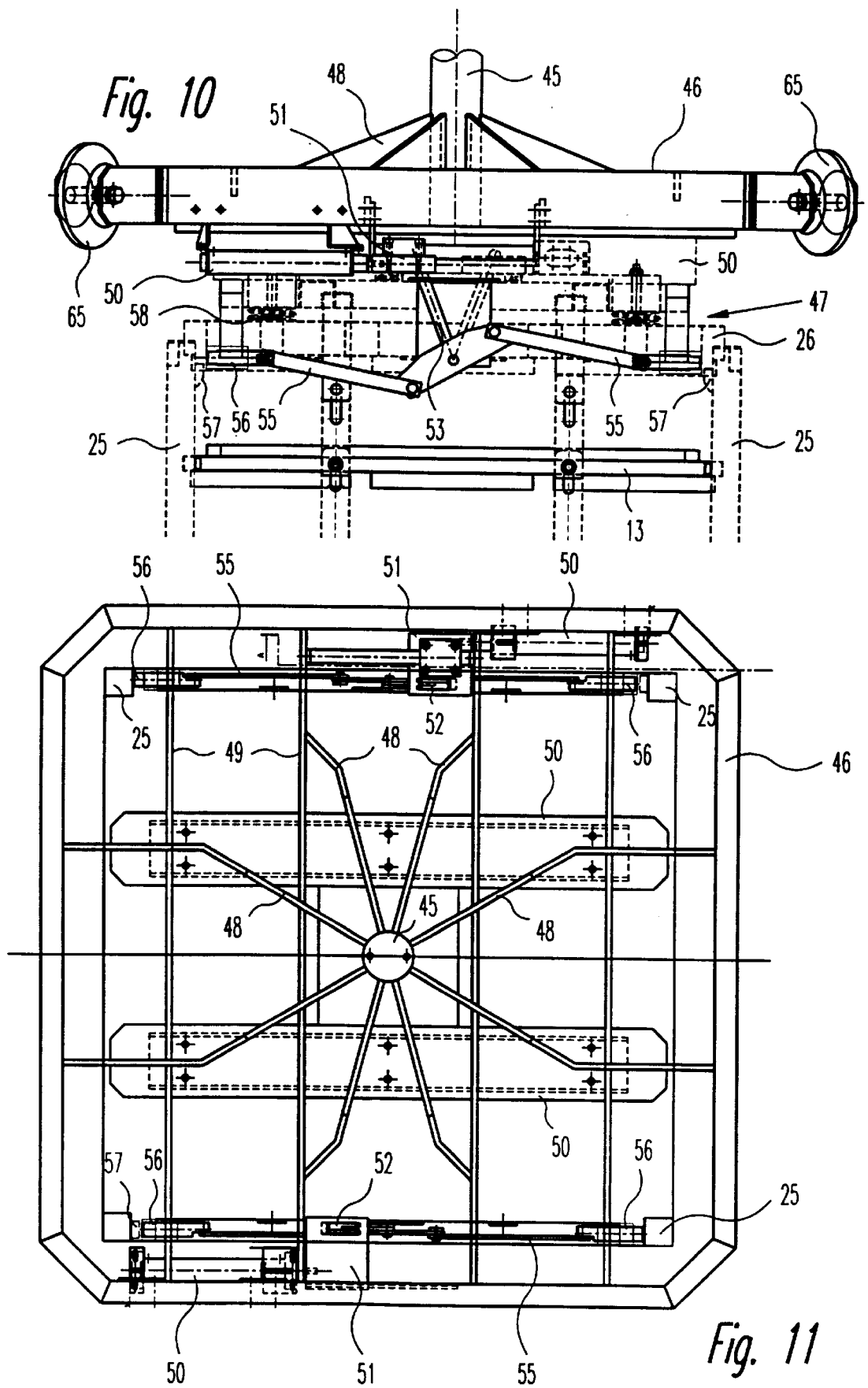

METHOD OF HANDLING MOULDS CONTAINING MEAT PRODUCTS AND PLANT FOR THE EXECUTION OF THE METHOD

BACKGROUND OF THE INVENTION

The invention relates to a method for the handling of moulds containing meat products in connection with a pressing column in which the moulds are placed in layers on top of one another, and thereafter pressed downwards by a pressing apparatus working from above, whereby the meat products are compressed in the moulds by the mutual pressure between the layers, after which the moulds are removed from the column.

The invention also relates to a plant for the execution of the method, and which comprises a pressing column in which the moulds are placed in layers for the pressing of meat products, and where the layers are arranged in the column in such a manner that a pressure exercised by a pressing device on an upper part resting on the upper layer can be transferred to all underlying layers.

Such a method is known. The column, which normally consists of a frame with four vertical stays in the corners as frame, is filled up with filled moulds in layers. The moulds can, for example, be intended for the pressing of ham-meat in the forming of hams, and can have an elongated, rectangular or other geometry. The moulds usually consist of several adjoining individual moulds, and they are placed on shelves having an underside which functions as upper part for the moulds in the underlying layer. With the known technique, the moulds are stacked in the column manually, and since the mould with contents can weigh up to 40 kg, this involves a considerable physical load for the personnel who do the work. Similarly, the column is emptied manually, and this work often results in a rapid deterioration in the health of the personnel.

When the column has been filled, an upper part is placed on the uppermost layer, and in the pressing device the moulds are exposed to pressure from a hydraulic cylinder or other pressure-generating device. In the compressed state, the upper part is locked to the column, after which a boiling of the hams can take place. The handling of the filled column is carried out either with a fork-lift truck or on a bogie.

SUMMARY OF THE INVENTION

The special aspect of the method according to the invention is that filled moulds in each layer are transferred from a platform on to support elements in the column from the side while the layers are held separate, in that the uppermost layer is lifted by one or more traction elements, and where the underlying layers are connected to the upper layer and to one another with link connections which permit a clearance between the layers, and that after compression of the meat products the layers are separated, after which the moulds are drawn out on the same or another platform.

By using the method according to the invention, the manual work can thus be considerably reduced or completely eliminated. From the platform, which is on a level with the layer which is to be filled with moulds, the moulds are pushed in onto the support elements. Because of the special link connection between the support elements in each layer, the layers can be held separated during the filling and thereafter pressed together in the pressing apparatus. Finally, the layers can again be separated for emptying of the pressing column over onto a platform which is on a level with the respective layer to be emptied. Embodiments for the method, where the platform is stationary and where the layers are gradually raised to the level of the platform, can be envisaged.

By automatically inserting and removing the moulds in the column from the side, while the layers are held separated, and in that the moulds after insertion before the compression are positioned horizontally in or against the direction of insertion, the possibility is provided for an effective and precise positioning of the moulds, in that the actual insertion can thus be carried out without the use of advanced control mechanisms, in that the necessary positioning of the moulds can thus be effected in a separate operation. By use of the usual means of insertion, for example a pressure cylinder, it is possible at each insertion to push the moulds too far in the direction of insertion. The method can hereby be made more simple, in that the final positioning is always carried out in the same direction. This execution of the method can naturally also be exercised in accordance with the same principles by letting the insertion elements not push all the moulds far enough.

Similarly, the positioning can be carried out at the same time by counter-acting means of insertion, so that the precision of the used insertion means in relation to the final positioning is immaterial.

According to the invention, the possibility is thus provided of a partly or fully automatic method for the handling of moulds containing meat products in connection with pressing columns.

Moreover, the possibility is provided for a very precise positioning in relation to the vertical, providing that a vertical column of moulds is positioned at the same time by a cooperating element, which results in reduced requirements regarding the positioning, the reason being that the decisive factor for the subsequent process is that the moulds fit mutually into one another during the compression.

By positioning two or more moulds at the same time, the possibility is achieved for a very quick placing of all moulds in the correct position, in that the actual positioning, which in itself is time-consuming, can be effected in one operation and not for each insertion. There can thus be achieved a degree of optimization from the point of view of time which corresponds to the number of moulds in the pressing column.

By letting the positioning elements execute an initial movement of one or more moulds in the direction of removal before the moulds are taken out, is is possible to limit the minimum length of stroke necessary for the means of removal.

As disclosed in claim 4, by letting the positioning and/or the initial movement of all moulds in the pressing column be carried out simultaneously, a very advantageous embodiment according to the invention is achieved, in that the resulting saving in time is optimal. Moreover, the demands with regard to positioning can be reduced, since a possible bias arising in connection with the positioning will be distributed equally to all moulds, whereby the error in relation to the mutual placing of the moulds becomes immaterial. This again provides possibility for the use of less advanced servomechanisms, and herewith significant savings with regard to both time consumption and the material used.

By positioning the moulds by means of a series of transverse rods or a transverse surface which is fed in the direction of insertion, a practical and inexpensive embodiment according to the invention is achieved.

By letting the moulds after compression and separation of the layers be partly pushed out with a series of transverse rods, a further advantage according to the invention is achieved, in that the positioning arrangement can thus limit the length of stroke necessary for the removal mechanism.

By providing the plant with support elements with guides for the moulds in each layer, so that the moulds can be pushed in sideways in relation to the column and drawn out of each layer by means of an insertion and retraction arrangement, and that the support elements in the layers are mutually connected by links which allow the layers to hang separated and with a mutual clearance below one another when the uppermost layer is raised to a top position, and where a platform exists from which moulds can be pushed in onto the support elements in a layer, said plant being further provided with a positioning arrangement consisting of one or more displacement elements mounted either on the platform and/or the pressing apparatus, all things considered a simple and inexpensive, fully automatic unit is achieved, in that the positioning arrangement can effect the final placing of the moulds in the column's guides in a separate operation.

This advantage becomes particularly distinct when the positioning arrangement comprises servo-displacement elements which, via in principle one contact surface or arrangement, can bring about an overall movement of all of the moulds in the guides to the final, mutual positioning of the moulds.

In addition to the considerable reduction in the use of manual labour, the filling and the emptying of the column can also be effected much more quickly than with the known methods.

BRIEF DESCRIPTION OF THE DRAWINGS

A preferred example embodiment for the method and the plant according to the invention will now be described in more detail with reference to the drawing, where FIG. 1 shows the layout of a plant according to the invention seen from above, FIG. 2 shows a workstation for the filling of the pressing column, seen in section, FIG. 8 shows a pressing apparatus with a pressing column seen partly in section, FIG. 9 shows the frame of the pressing apparatus seen from the right in FIG. 8, FIG. 10 shows an enlarged detail of a pressing frame and the upper part of the pressing column, FIG. 11 shows the same as FIG. 10, but seen from above.

DESCRIPTION OF THE PREFERRED EMBODIMENTS

Figure 3:
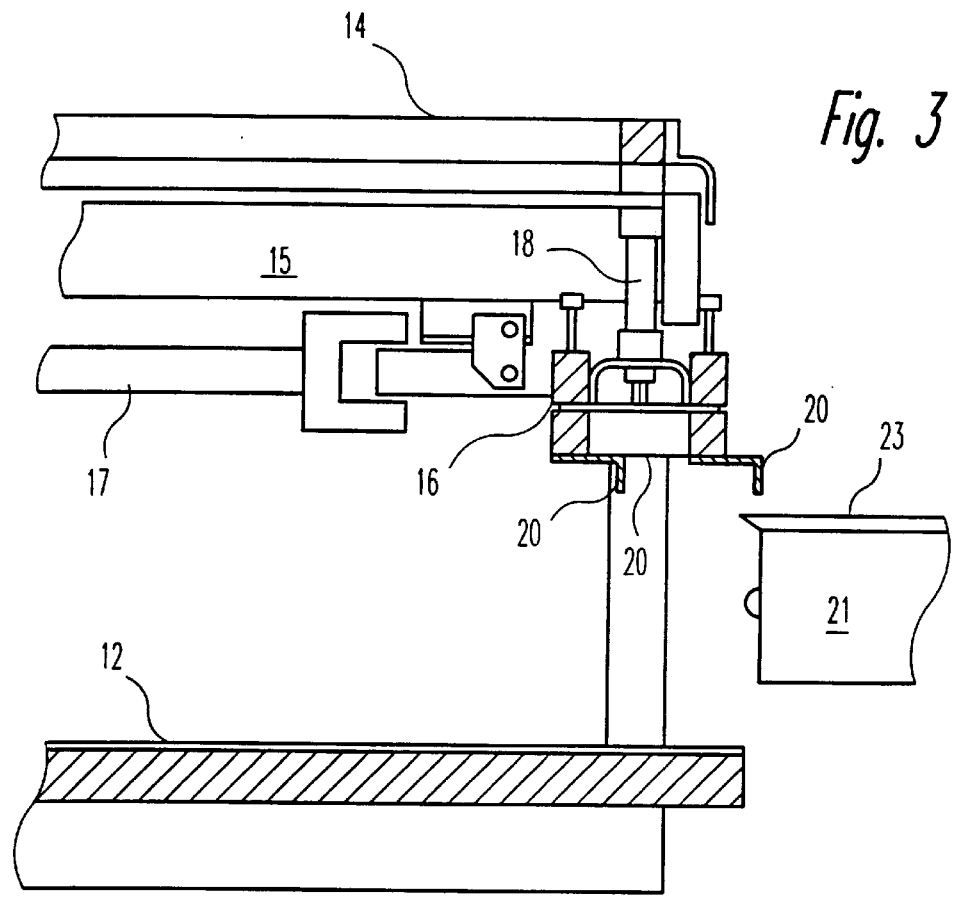
FIGS. 3 and 4 show a displacement arrangement on a platform for moulds, seen respectively in section and from the side of the pressing column.

A preferred embodiment of a plant according to the invention for use in the pressing of hams in moulds is provided with a roller conveyor 1 with rollers in the sides and a chain drive in the center for the transport of pressing columns 2. The plant shown in FIG. 1 comprises two of several workstations, i.e. a filling and pressing station 3 and an emptying and de-moulding station 4. A third and not-shown workstation is a chamber for the boiling of the pressed hams. The direction in which the pressing columns are transported will thus be in the direction of the arrow 5, i.e. towards the right to the boiling chamber and back to the emptying station 4.

Behind the workstations 3, 4 there are provided two tables 6 and 7 where respectively the pressed hams are removed from the moulds and thereafter the moulds are filled with meat before they are loaded into the pressing column 2.

When the moulds have been filled with ham-meat in plastic bags on the table 7, they are transferred on to a platform 8 which can be adjusted in height. The platform is placed between two aprons 9 which contain a chain drive 10. A beam 11 is connected to a not-shown stanchion guide inside the aprons 9. The chain drive 10 is driven by an electromotor, but other means for raising and lowering the platform 8 are naturally possible within the spirit of the invention, e.g. hydraulic or pneumatic systems. The level at which the platform 8 is placed is controlled by a not-shown control circuit, so that the top 12 of the platform can be set on a level with the support elements in the form of trays 13 in the pressing column 2. The level control is effected by means of photo-electric cells, but also here there can be used other means.

Figure 4:
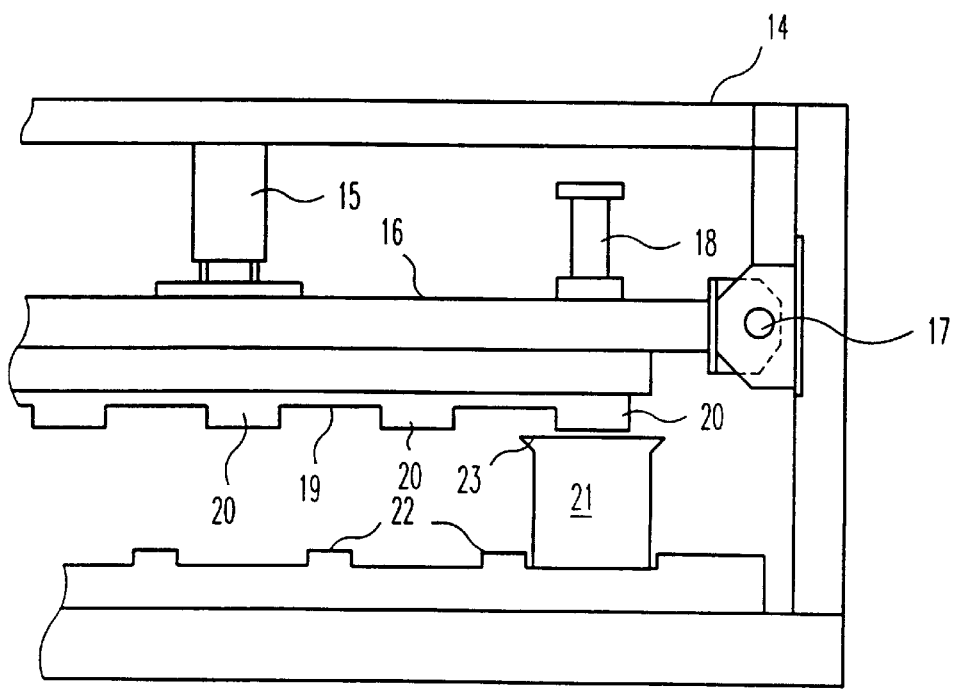

The platform 8 is provided with a displacement arrangement 14 which is shown partly in detail in FIGS. 3 and 4. Here there is a piston-free pneumatic cylinder 15, the underside of which is coupled to a carriage 16. This carriage 16 is mounted in a displaceable manner on guides 17 along the whole length of the platform 8. On the carriage 16 there are provided two pneumatic cylinders 18 which can displace a frame 19 with two rows of hooks 20. The stroke length of the cylinder 18 and the dimensioning of the hooks 20 and the remaining distances in the arrangement are such that a pressing mould 21 can pass under the hooks 20 when the frame 19 is in its raised position as shown in FIG. 3. The moulds can slide on the upper side 12 controlled by the guides 22. At the top of the mould 21, the length of which corresponds to the breadth of a pressing column 2, and which internally is divided into several moulds, there is provided an outwardly-bent edge 23.

By using the displacement arrangement 14 on the platform 8, a complete set of moulds in a layer can be pushed into the pressing column 2 in one operation. That there are two rows of hooks 20 on the displacement arrangement is because it is possible hereby to compensate for limitations in the stroke length of the cylinder 15. The rearmost hook 20 can thus draw the moulds slightly forward before the second and foremost hook can push the moulds in onto the support elements 13.

The workstations 3 and 4 can be built up in an identical manner, in that in some cases the execution will be varied when a pressing has to take place in station 3 and a releasing of the pressure in station 4.

Figure 7:
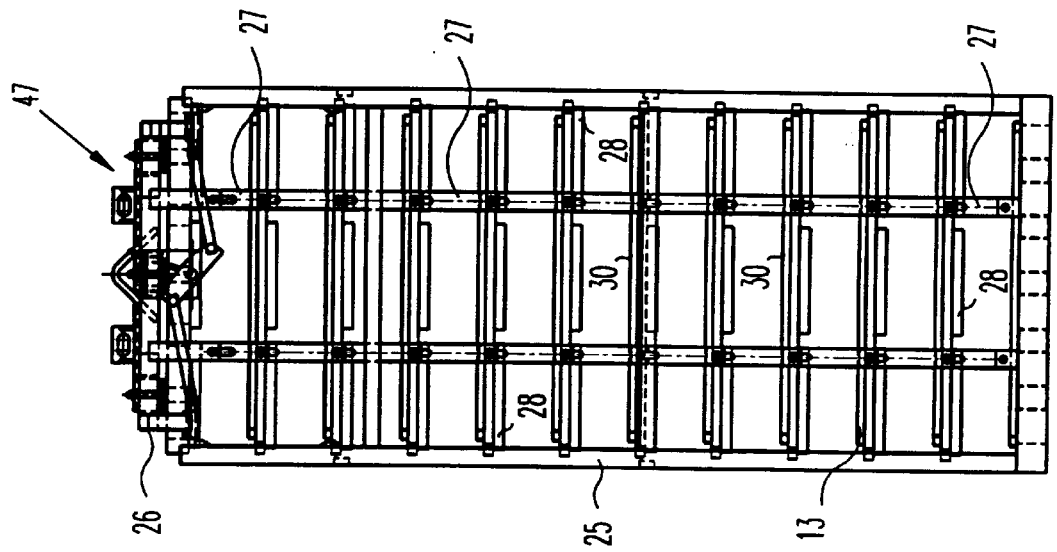
FIGS. 6 and 7 show the pressing column seen from two different sides which are at right-angles to each other.
Figure 6:
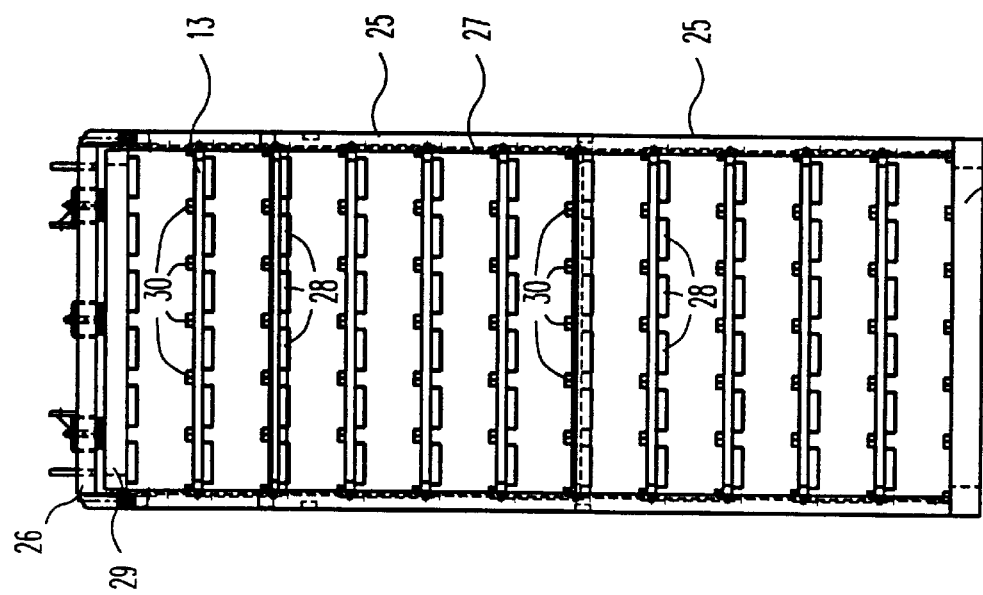

The pressing columns are configured as independent units, cf. FIGS. 6 and 7, which can be transported independently on the roller conveyor 1. With other embodiments of the method according to the invention, it is naturally possible to use other means of transport than a roller conveyor. The pressing column 2 is built up with a bottom frame 24 and four corner stays 25 which uppermost are held together by a top-piece 26. The top-piece 26 can be moved in relation to the stays 25 and the bottom frame 24, and is also connected to the bottom frame via links 27 which form a chain to the bottom frame 24. Each link is pivotably hinged around a pin to the underlying tray 13, and is provided at its upper end with an elongated slot which allows movement of the over-lying tray in relation to the underlying tray. Each tray 13 is controlled at its corners by the stays 25. The underside of each tray is provided with pressing moulds 28 which transfer the pressure from the overlying parts to the ham-meat in the underlying mould. The lowermost layer of moulds in the pressing column rest directly on the bottom frame 24, while above the uppermost layer of moulds there is only a frame 29 where the underside has pressing moulds 28. As shown, there are spaces in the longitudinal direction of the pressing moulds to permit the passage of corresponding separation walls in the moulds 21. The trays 13 are accessible from the side at right-angles to that side which has the links 27, and in the same manner as the platform 8 said trays 13 are provided with longitudinal guides 30 for the guiding of the moulds 21.

Figure 5:
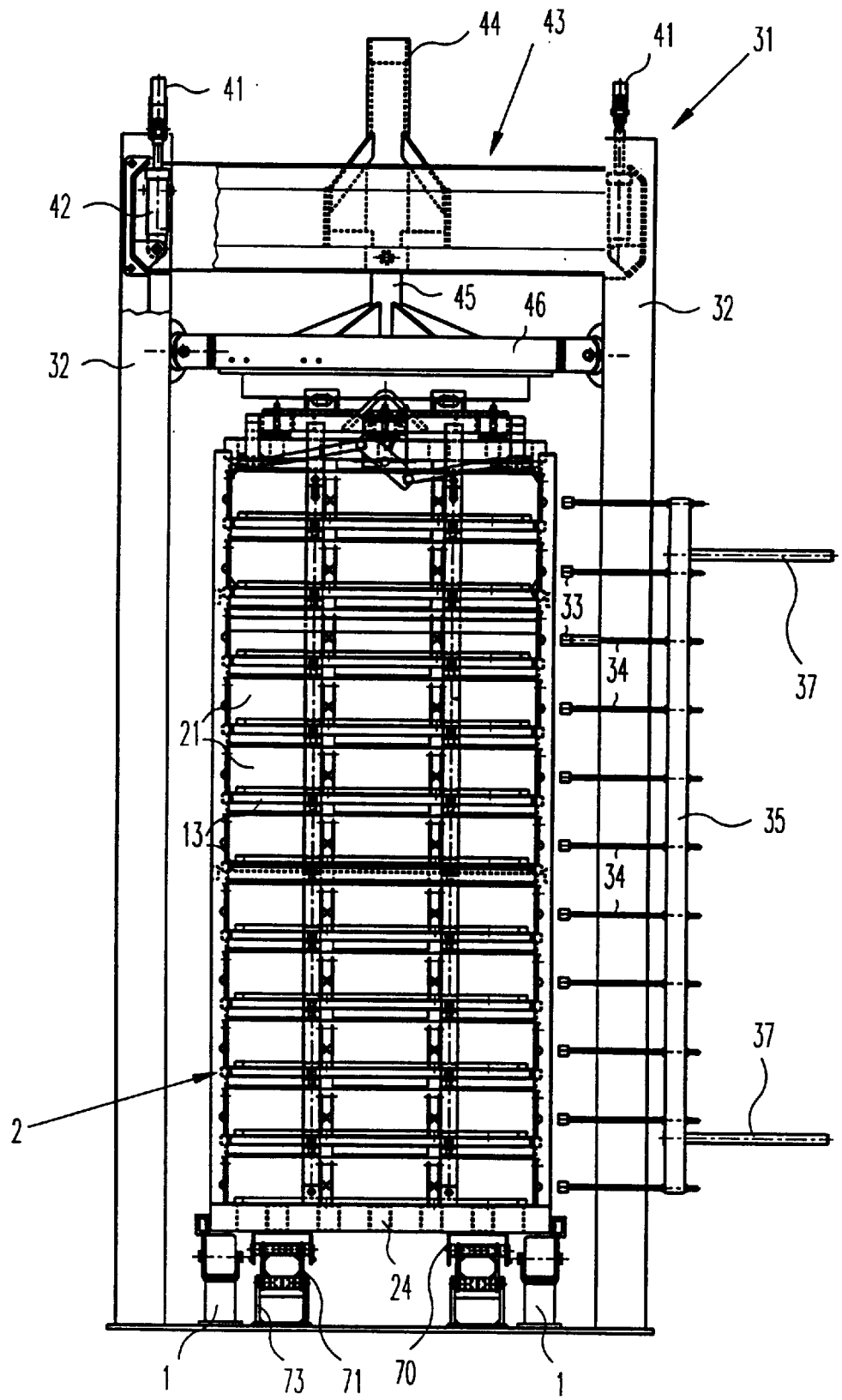
FIG. 5 shows the pressing column placed in a workstation in a pressing apparatus.

In the filling and pressing station 3, the pressing column 2 is placed in a pressing apparatus 31, the corner columns 32 of which are shown in section in FIG. 1. On that side of the pressing column 31 which is opposite the platform 8, between the columns 32 there is suspended a grill in the form of a series of rods 33. The rods 33 are hung up on the columns 32 of the pressing apparatus as shown in FIGS. 5, 8 and 9. Each rod 33 is held by two threaded stays 34 which are secured to a frame 35. The frame 35 is suspended in a displaceable manner on two transverse stays 36 with guides 37. Displacement of the stays 33 towards and away from the pressing column 2 is carried out by means of two pneumatic cylinders 38. It should be noted that out of regard for clarity, FIG. 5 does not show all details of this arrangement.

The columns 32 of the pressing apparatus each contain two stabilizing elements 39 which by traction on stays 40 can be brought into engagement with the two corners of the pressing column, see FIG. 8. The stays 40 are uppermost and mutually in pairs connected with girders 41 which can be displaced in the vertical direction by means of pneumatic cylinders 42.

The columns 32 of the pressing apparatus are uppermost connected to a top-frame 43, in the center of which there is supported a guide 44 for the cylindrical column 45 which transfers the pressure from a not-shown hydraulic cylinder to the upper part 47 of the pressing column 2. At the lowermost end of the column 45 there is a press frame 46, the details of which can be seen in FIGS. 10–13. In addition to exercising a compressive force on the upper part 47, which also contains the top-piece 26, the frame 46 can also contribute towards the drawing of the trays 13 away from each other to their separated position as shown in FIG. 5.

The frame 46, cf. FIG. 11, is connected by angular plate sections 48 to the column 45, and another series of elongated sections 49 stiffen the frame 46 internally and form the basis for the suspension of two pressing rails 50. At two side edges of the frame there is disposed a pneumatic cylinder 66, the piston-rod end of which is provided with a block 51. In the block 51 there is a slot 52 which can accommodate the end of an actuating rod 53 on the upper part 47. The rod 53 is connected to a pivotable intermediate piece 54 on the upper part 47, said piece 54 being connected to rods 55. By activation of the cylinder 66, the rods 55 can move oppositely-directed bolts 56 into engagement with the stays 25. When the upper part 47 is raised to its top position as shown in FIG. 10, the bolts 56 can rest on projecting stops 57 welded on the inner side of the stays 25. When the upper part 47 is in its bottom position, which is not shown, the bolts 56 can enter into engagement with not-shown recesses in the stays 25, and which lie under the stops 57. The upper part can thus be locked in its top position, where the trays 13 are drawn up at a distance from one another, and also in its bottom position where the trays are compressed around the moulds 21.

Figure 12:
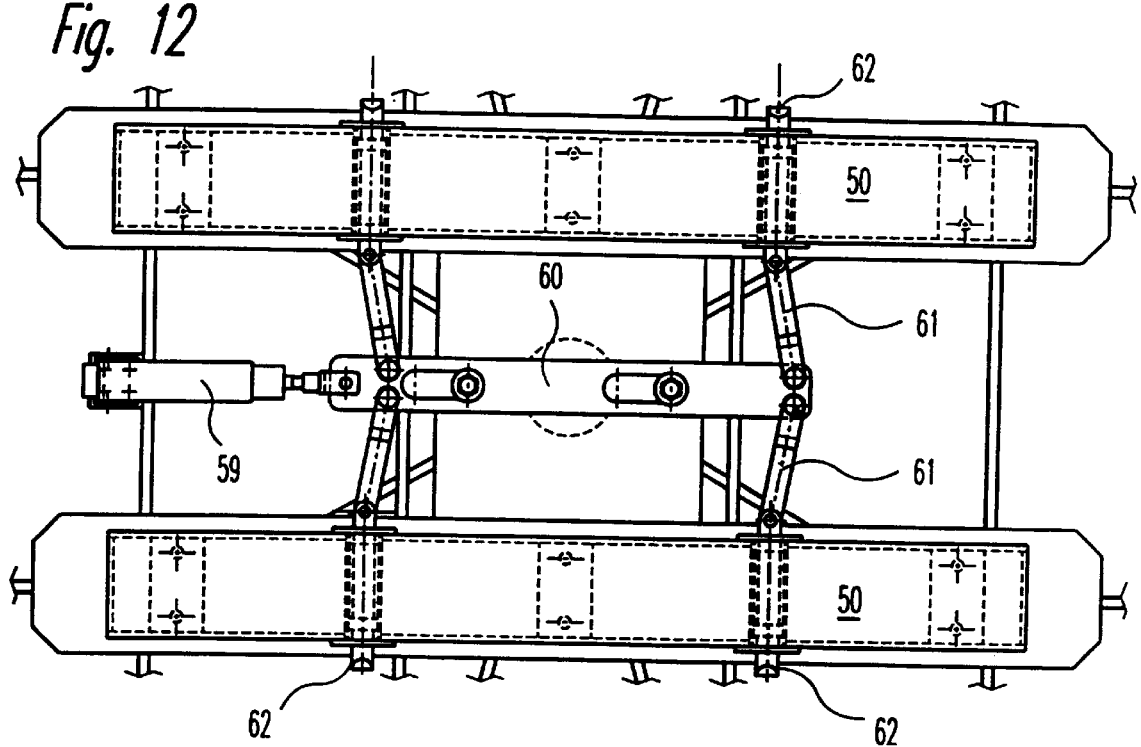
FIGS. 12 and 13 show press rails and locking mechanism on the pressing frame, seen respectively from below and in section from the side.
Figure 13:
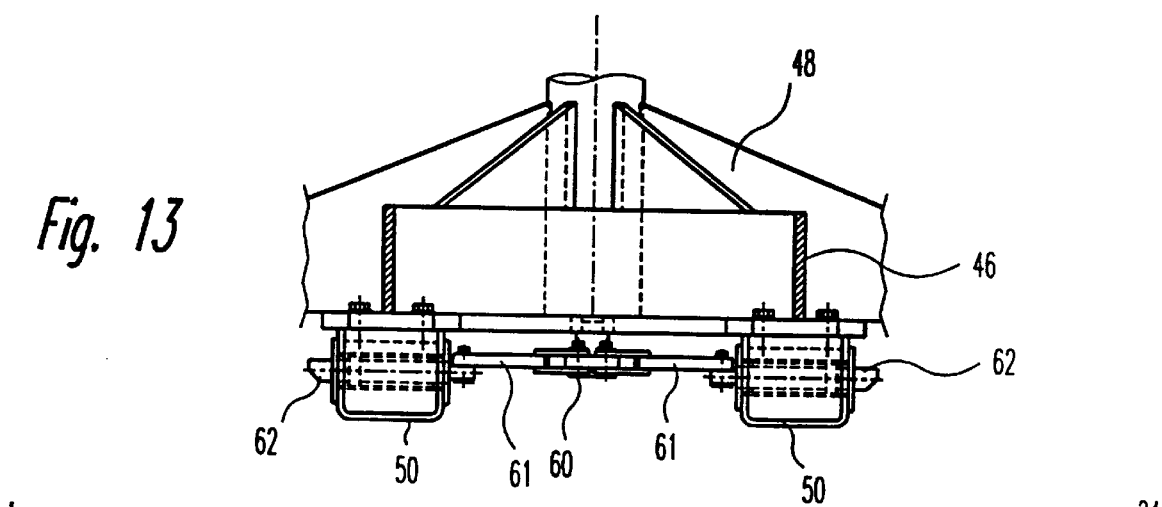

The two pressing rails 50, cf. FIGS. 12–13, transfer the compressive force from the column 45 to the upper part 47. As shown in FIG. 10, springs 58 can be used to avoid shock loads during the compression. The pressing rails are provided with a locking arrangement which can be activated by a pneumatic cylinder 59 secured to the frame 46. The locking arrangement consists of a horizontally-displaceable plate piece 60 which is provided at each end with oppositely-directed pairs of rods 61. By a movement of the piece 60, the rods 61 can displace bolts 62 in relation to the rails 50. The bolts 62 can enter into engagement with not shown eyelets fastened to on the upper part 47, whereby a pulling engagement is achieved between the frame 46 and the upper part 47. It is hereby possible to create the tractive force which is necessary to raise the upper part 47 to its top position.

Figure 14:
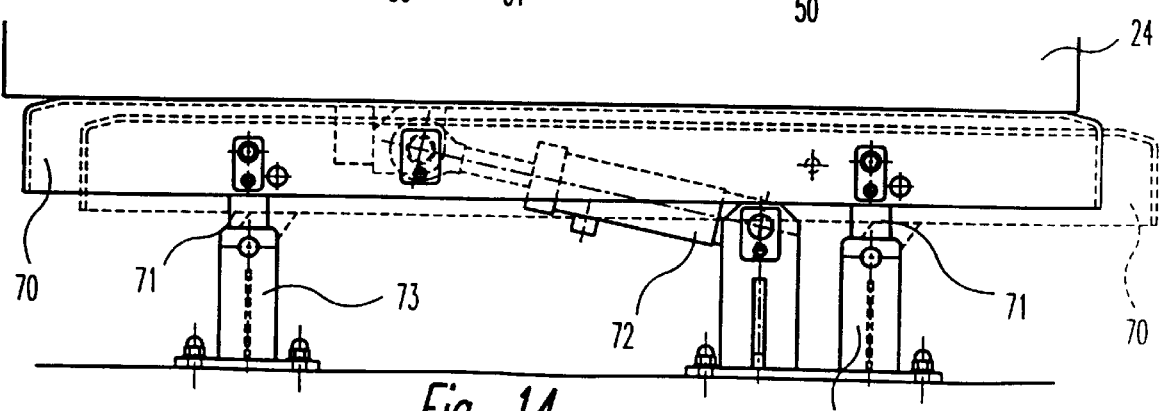
FIG. 14 shows a support arrangement for the pressing column in the pressing apparatus.

As shown in FIG. 5, the base frame 24 of the pressing column 2 normally rests on the roller conveyor 1. When a compression of the meat products is to be carried out in the pressing apparatus 31, a support member 70 is used to absorb the compressive force from the pressing frame 46. When the pressing column 2 is to be conveyed into the pressing apparatus 31, the support members 70 are lowered into a position in which they cannot be touched by the base frame 24 of the column, cf. FIG. 14, where they are shown with stippled lines. The support members 70 are suspended on a pivotable link 71, and can be brought into engagement with the base frame 24 by means of a pneumatic cylinder 72. In the position in which the support members 70 are shown with fully-drawn lines, the compressive force is transferred vertically through the links 71 to under-supports 73.

As shown in FIG. 10, the pressing frame 46 is provided at the corners with wheels which can run internally in the open column profiles 32.

Out of regard for standardization of the parts involved, the configuration of the de-moulding and emptying station 4 can be the same as the filling station 3. However, the emptying station 4 does not need any compressive force, since the pressing column 2 at this workstation is already in the compressed state. All that is required to take place is the releasing of the bolts 26 and thereafter the raising of the upper part 47.

By a method according to the invention, empty moulds are filled with meat products in the filling station 3. The moulds 21 are set in rows on the platform 8 which stands on a level with the worktable 7. A manual lifting of the moulds 21 is hereby avoided, in that they can merely be pushed over on to the platform 8. Under automatic control, the platform 8 can hereafter be raised on a level with trays 13, e.g. the uppermost in the pressing column 2 and controlled by the aforementioned photocells. The displacment arrangement 14 is now activated by the control system, after which the frame 16 is fed back to the rear edge of the moulds and pushes them into the tray 13. The two rows of hooks 20 on the arrangement 14 are necessary to achieve sufficient reach when the moulds 21 are to be gripped and fed all the way into the column 2. When fed into the column 2, the moulds 21 are fed further in than that position in which they must lie in order for the pressing moulds 28 to avoid hitting the edges 23 of the moulds. When the whole column has been filled up, the so-called grill 33 with stays 34 is moved in against the moulds 21 so that all of the moulds 21 in the whole of the column are arranged with their side edges in the same vertical planes. Hereafter, the cylinders 66 are activated so that the manoeuvring rods 53 stand in their released position, cf. the fully-drawn lines in FIG. 10, i.e. that the bolts 56 are drawn out of the retainers 57. Since the upper part 47 is clamped firmly to the frame 46 by means of the bolts 62, the upper part 47 does not fall down. Hereafter, a compression is effected by means of a not-shown hydraulic cylinder which is connected to the column 45. During the compression, the links 27 are mutually moved because of the slots therein. The pressing moulds 28, which transfer the compressive force to the meat product in each mould 21, are further safeguarded against hitting the upper edges 23 because of the outwardly-bent shape of said edges. Upon completion of the compression, and the upper part has reached its bottom position, the cylinders 66 are activated again into their locked position, whereby the bolts 56 engage with holes in the stays 25. In this situation, the compression is complete and the cylinder 59 releases the bolts 62 from the eyelets. Hereafter, the frame 46 is lifted free of the upper part 47, and the column 2 can be conveyed further into its locked position by the roller conveyor 1.

After the boiling, the column is conveyed to the de-moulding and emptying station 4. Here, a series of actions take place in a reverse sequence to that which was executed in the station 3. The frame 46 is thus lowered down into engagement with the upper part 47, and the bolts 62 are brought into engagement with the eyelets, after which the bolts 56 are drawn out of engagement with the column's stays 25. If the workstations 3, 4 are identical, the upper part 47 is raised by drawing the frame 46 from an overlying hydraulic cylinder, or by other means, after which the bolts 56 are brought into engagement with the retainers 57 in the top position. With the grill of rods 33, all of the moulds 21 are pushed some distance out, so that the outer-most hooks 20 on the displacement arrangement 14 can get a grip on the closest-lying edges of the mould 21. Hereafter, the moulds 21 are drawn out from the trays 13 in sets, in that after each extraction the platform is fed back to the level of an emptying table 6. Here, the moulds can be emptied of the pressed meat products manually, and the moulds 21 can hereafter be fed over to the worktable 7 where they are filled again.

When the column is empty, in its separated position it can be released from the frame 46 and conveyed back to the filling station 3, after which the process is repeated.

We claim:

1. A method for the handling of moulds containing meat products in connection with pressing columns, comprising placing the moulds in layers on top of one another and thereafter pressing downwards with a pressing apparatus which works from above, compressing the meat products in the moulds by mutual pressure between the layers, and thereafter removing the moulds from the column, inserting the moulds automatically and laterally into and removing the moulds from the column while the layers are held separated, and after insertion positioning the moulds before compression in relation to the vertical in or towards the direction of insertion by means of a series of transverse rods or a transverse surface fed against a direction of displacement, the positioning being effected simultaneously on all moulds in the pressing column.

2. The method according to claim 1, in which before the removal of the moulds and after compression and separation of the layers, the positioning comprises an initial movement of the moulds in the direction of removal, the moulds being partly pushed out with the transverse rods.

3. A plant for handling moulds containing meat products comprising a pressing column in which moulds are placed in layers for compressing the meat products in the moulds, the layers being suspended in the column so that a compressive force exercised by a pressing apparatus on an upper part resting on the upper most layer for transferring to all of the underlying layers, support elements for each layer having guides for the moulds, for pushing the moulds in and drawing the moulds out of each layer sideways in relation to the column by means of an insertion and removal arrangement, the support elements in the layers being mutually connected by links which allow the layers to hang separated and with mutual clearance under one another when the upper layer is raised to a top position, and including a platform for pushing the moulds in on the support elements, said plant further including a positioning arrangement comprising a frame for the pressing apparatus, and said frame having on its side opposite the platform a series of rods disposed outside the layers in their raised position for displacing the moulds to a defined final position.

4. The plant according to claim 3, in which the frame is fed by a precision servo-arrangement.

5. The plant according to claim 3, in which one end of each link is pivotably-connected to the support element, and the other end of the link is displaceably connected with a longitudinal slot to a pin on the support element in another layer.

6. The plant according to claim 3, including means for locking the upper part to the column frame by bolts.

7. The plant according to claim 3, including means for raising and lowering the platform to the level of any of the layers in their separated state.

8. The plant according to claim 3, in which the platform includes a displacement element for pushing a row of moulds from the platform over on to the support elements in a layer.

9. The plant according claim 3, in which the platform or another platform has a pulling element provided with hooks for engagement with the closest-lying upper edges of a set of moulds.

10. The plant according to claim 3, including a conveyor for the transport of the pressing column between a plurality of different workstations, on which conveyor the column rests during its transport, and including retainers on a fixed underlayer at the pressing apparatus for engagement with the base of the column when the column stands in the pressing apparatus.

11. The plant according to claim 3, including a filling and pressing station, a boiling station and an emptying and de-moulding station, the emptying and de-moulding station including a disengagement apparatus for releasing the bolts from the column and raising the upper part.

12. The plant according to claim 3, including pressing moulds with a geometry corresponding to the moulds containing meat products, in which the upper edges of the pressing moulds, at least at the ends, are bent outwards.

* * * * *